US012567825B2

(12) United States Patent
Su et al.

(10) Patent No.: US 12,567,825 B2
(45) Date of Patent: Mar. 3, 2026

(54) HYBRID POWER SYSTEM AND OPTIMIZING METHOD THEREOF

(71) Applicant: APh ePower Co., Ltd., Kaohsiung City (TW)

(72) Inventors: Hsiu-Hsien Su, Kaohsiung City (TW); Chien-Hsun Wu, Kaohsiung City (TW); Shang-Zeng Huang, Kaohsiung City (TW)

(73) Assignee: APh ePower Co., Ltd., Kaohsiung City (TW)

( * ) Notice: Subject to any disclaimer, the term of this patent is extended or adjusted under 35 U.S.C. 154(b) by 397 days.

(21) Appl. No.: 18/336,959

(22) Filed: Jun. 17, 2023

(65) Prior Publication Data

US 2024/0204708 A1 Jun. 20, 2024

(30) Foreign Application Priority Data

Dec. 19, 2022 (TW) .................................. 111148792

(51) Int. Cl.
*H02P 29/00* (2016.01)
*B60W 20/20* (2016.01)
(52) U.S. Cl.
CPC ................................. *H02P 29/0027* (2013.01)
(58) Field of Classification Search
CPC ...... H02P 29/0027; Y02T 10/62; B60K 6/442
See application file for complete search history.

(56) References Cited

U.S. PATENT DOCUMENTS

| | | | | |
|---|---|---|---|---|
| 6,740,002 | B1 * | 5/2004 | Stridsberg | B60W 10/11 |
| | | | | 903/910 |
| 12,258,000 | B2 * | 3/2025 | Su | B60K 6/46 |
| 12,409,830 | B2 * | 9/2025 | Hasegawa | B60K 1/00 |
| 2009/0150016 | A1 * | 6/2009 | Hung | B60W 10/06 |
| | | | | 903/905 |

(Continued)

FOREIGN PATENT DOCUMENTS

| | | |
|---|---|---|
| CN | 102673364 | 9/2012 |
| CN | 103025593 | 11/2015 |

(Continued)

OTHER PUBLICATIONS

"Office Action of Korea Counterpart Application", issued on Apr. 8, 2025, p. 1-p. 6.

(Continued)

*Primary Examiner* — Scott T Baderman
*Assistant Examiner* — Mario M Velez-Lopez
(74) *Attorney, Agent, or Firm* — JCIPRNET

(57) ABSTRACT

A hybrid power system including a control core, a driving mechanism, an internal combustion engine, an electric motor, and a storage battery is provided. The driving mechanism is controlled by the control core. The internal combustion engine is connected to the driving mechanism and controlled by the control core. The electric motor is connected to the driving mechanism and controlled by the control core. The storage battery is coupled to the electric motor and the control core. In response to a required torque being input to the control core, the control core executes an equivalent consumption minimization strategy and actuates the internal combustion engine and/or the electric motor to transmit power to the driving mechanism.

17 Claims, 4 Drawing Sheets

(56) References Cited

U.S. PATENT DOCUMENTS

| | | | |
|---|---|---|---|
| 2009/0308674 A1 | 12/2009 | Bhattarai et al. | |
| 2015/0291150 A1* | 10/2015 | Sujan | B60W 20/20 |
| | | | 180/65.265 |
| 2016/0221570 A1* | 8/2016 | Chen | B60W 30/1882 |
| 2018/0043899 A1* | 2/2018 | Prost | B60K 6/547 |
| 2018/0115265 A1* | 4/2018 | Nayfeh | B64U 50/19 |
| 2019/0039474 A1* | 2/2019 | Wada | H02J 7/00 |
| 2019/0084555 A1* | 3/2019 | Omuro | B60W 10/08 |
| 2020/0108709 A1* | 4/2020 | Kohler | B60K 6/547 |
| 2020/0371721 A1 | 11/2020 | Karamanolis et al. | |
| 2021/0229663 A1* | 7/2021 | Niessen | B60W 10/023 |
| 2021/0300320 A1* | 9/2021 | Tachibanada | B60W 10/30 |
| 2022/0048493 A1 | 2/2022 | Crisp et al. | |
| 2024/0204708 A1* | 6/2024 | Su | B60W 10/06 |

FOREIGN PATENT DOCUMENTS

| | | |
|---|---|---|
| CN | 105258944 | 1/2016 |
| CN | 212482902 | 2/2021 |
| DE | 102021204618 | 11/2022 |
| EP | 4023514 | 7/2022 |
| JP | 2015116936 | 6/2015 |
| JP | 2016206177 | 12/2016 |
| KR | 102224112 | 3/2021 |
| WO | 2012097349 | 7/2012 |
| WO | 2013014510 | 1/2013 |
| WO | 2015060460 | 4/2015 |

OTHER PUBLICATIONS

"Office Action of Taiwan Counterpart Application", issued on Dec. 7, 2023, p. 1-p. 9.

"Search Report of Europe Counterpart Application", issued on Jun. 3, 2024, pp. 1-7.

Kuen-Bao Sheu, "Simulation for the analysis of a hybrid electric scooter powertrain", Applied Energy, vol. 85, Issue 7, Jul. 2008, pp. 589-606.

Sheng-Chung Tzeng et al., "Optimization of the dual energy-integration mechanism in a parallel-type hybrid vehicle", Applied Energy, vol. 80, Issue 3, Mar. 2005, pp. 225-245.

O. Erdinc et al., "A wavelet-fuzzy logic based energy management strategy for a fuel cell/battery/ultra-capacitor hybrid vehicular power system", Journal of Power Sources, vol. 194, Issue 1, Oct. 20, 2009, pp. 369-380.

TomažKatrašnik, "Analytical method to evaluate fuel consumption of hybrid electric vehicles at balanced energy content of the electric storage devices", Applied Energy, vol. 87, Issue 11, Nov. 2010, pp. 3330-3339.

Wei Xu et al., "Torque optimization control for electric vehicles with four in-wheel motors equipped with regenerative braking system", Mechatronics, vol. 57, Feb. 2019, pp. 95-108.

Qingsong Tang et al., "A novel electro-hydraulic compound braking system coordinated control strategy for a four-wheel-drive pure electric vehicle driven by dual motors", Energy, vol. 241, Feb. 15, 2022, pp. 1-17.

Yi-Hsuan Hung et al., "A combined optimal sizing and energy management approach for hybrid in-wheel motors of EVs", Applied Energy, vol. 139, Feb. 1, 2015, pp. 260-271.

Roberto Capata, "Urban and Extra-Urban Hybrid Vehicles: A Technological Review", Energies, vol. 11, Oct. 26, 2018, pp. 1-38.

Ali Solouk et al., "Energy Optimization and Fuel Economy Investigation of a Series Hybrid Electric Vehicle Integrated with Diesel/RCCI Engines", Energies, vol. 9, Dec. 4, 2016, pp. 1-23.

Zou Yuan et al., "Comparative Study of Dynamic Programming and Pontryagin's Minimum Principle on Energy Management for a Parallel Hybrid Electric Vehicle", Energies, vol. 6, Apr. 22, 2013, pp. 2305-2318.

Jia-Shiun Chen, "Energy Efficiency Comparison between Hydraulic Hybrid and Hybrid Electric Vehicles", Energies, vol. 8, May 26, 2015, pp. 4697-4723.

Jixiang Fan et al., "Map-Based Power-Split Strategy Design with Predictive Performance Optimization for Parallel Hybrid Electric Vehicles", Energies, vol. 8, Sep. 14, 2015, pp. 9946-9968.

Feiyan Qin et al., "Stochastic Optimal Control of Parallel Hybrid Electric Vehicles", Energies, vol. 10, Feb. 13, 2017, pp. 1-16.

Da Wang et al., "Optimal Control Strategy for Series Hybrid Electric Vehicles in the Warm-Up Process", Energies, vol. 11, Apr. 28, 2018, pp. 1-20.

Massimiliano Passalacqua et al., "Supercapacitor Storage Sizing Analysis for a Series Hybrid Vehicle", Energies, vol. 12, May 9, 2019, pp. 1-15.

"Office Action of Japan Counterpart Application", issued on Sep. 25, 2024, p. 1-p. 7.

* cited by examiner

100

HYBRID POWER SYSTEM AND OPTIMIZING METHOD THEREOF

CROSS-REFERENCE TO RELATED APPLICATION

This application claims the priority benefit of Taiwan application serial no. 111148792, filed on Dec. 19, 2022. The entirety of the above-mentioned patent application is hereby incorporated by reference herein and made a part of this specification.

BACKGROUND

Technical Field

The disclosure relates to a power system, and more particularly to a hybrid power system that adopts equivalent consumption minimization strategies.

Description of Related Art

Hybrid power vehicles have developed rapidly in the past few years, and the main advantage lies in the reduction of carbon dioxide and exhaust pollutant emissions. This is made possible by the more efficient use of energy in the hybrid power system, such as the improved charging and discharging capacity of the storage battery, the increased power storage, and the smoother control method for switching between the motor and the internal combustion engine.

The conventional optimizing method for the hybrid power system is used to achieve energy efficiency and improve the overall system power. Most conventional optimizing methods adopt rule-based control (RBC), and the characteristics of this optimization method are easy implementation, high computing efficiency, and fast experimental verification. That is, actuating conditions for three operation modes, such as low load, medium load, and high load, are set and the hybrid power system is allowed to switch automatically to the appropriate operation mode according to the required torque value and speed value. However, the conventional rule-based control optimization method is limited by overly simplified actuating conditions, which fail to achieve the purpose of energy efficiency optimization.

SUMMARY

The disclosure provides a hybrid power system that adopts equivalent consumption minimization strategies to achieve the best power distribution between an internal combustion engine and an electric motor, thereby improving the operating endurance of the hybrid power system.

The hybrid power system of the disclosure includes a control core, a driving mechanism, an internal combustion engine, an electric motor, and a storage battery. The driving mechanism is controlled by the control core. The internal combustion engine is connected to the driving mechanism and controlled by the control core. The electric motor is connected to the driving mechanism and controlled by the control core. The storage battery is coupled to the electric motor and the control core. In response to a required torque being input to the control core, the control core executes an equivalent consumption minimization strategy and actuates the internal combustion engine and/or the electric motor to transmit power to the driving mechanism.

The optimizing method of the hybrid power system of the disclosure includes a control core, a driving mechanism, an internal combustion engine, an electric motor, and a storage battery. The driving mechanism is controlled by the control core. The internal combustion engine is connected to the driving mechanism and controlled by the control core. The electric motor is connected to the driving mechanism and controlled by the control core. The storage battery is coupled to the electric motor and the control core. The optimizing method for the hybrid power system is described below. The hybrid power system is switched to a standby mode in response to a required torque detected by the control core being zero. A required torque is input to the control core to actuate the hybrid power system. It is determined whether the required torque is an arbitrary value greater than zero. The hybrid power system is switched to the standby mode in response to a negative result. An equivalent consumption minimization strategy is executed by the control core of the hybrid power system in response to a positive result. The internal combustion engine and/or the electric motor is actuated by the control core simultaneously to transmit power to the driving mechanism. The hybrid power system is switched off and showing a battery capacity of zero. The hybrid power system is switched to the standby mode.

In an embodiment of the disclosure, the equivalent consumption minimization strategy establishes a four-loop formula, conducts a global search for the required torque, a rotating speed of the electric motor, and a remaining storage battery capacity of the storage battery, and uses a global grid search to calculate the minimum equivalent consumption of all conditions and output a multi-dimensional table.

In an embodiment of the disclosure, a function of the minimum equivalent consumption is $J=\min[m_c+f(SOC)*m_m]+\gamma$.

In an embodiment of the disclosure, a corresponding array of values of the minimum equivalent consumption is obtained through the multi-dimensional table and through inputting parameters of a specific required torque, the rotating speed of the electric motor, and the remaining storage battery capacity, so as to find a corresponding output torque of the internal combustion engine in the array of values.

Based on the above, the hybrid power system of the disclosure is adapted for vehicles, and the hybrid power system has an internal combustion engine, an electric motor, a storage battery, and a driving mechanism. Through the equivalent consumption minimization strategy, the minimum energy consumption under different parameter conditions, such as torque, rotating speed, and remaining battery, may be calculated, so as to achieve the purpose of efficient driving and power recycling. With the equivalent consumption minimization strategy, the hybrid power system may automatically adjust the output ratio of the dual power of the internal combustion engine and the electric motor, thereby improving the operating endurance of the hybrid power system and avoiding damage and security issues caused by excessive charge/discharge of the storage battery.

Furthermore, the optimizing method of the hybrid power system of the disclosure adopts the equivalent consumption minimization strategy to set a minimum equivalent consumption function. The minimum equivalent consumption function may calculate the minimum equivalent fuel consumption of the internal combustion engine and the electric motor under test conditions. In addition, a penalty value is also added to the minimum equivalent consumption function, and the global grid search is used to output the multi-dimensional table, so as to calculate the performance of the hybrid power system under different parameter conditions.

DESCRIPTION OF THE EMBODIMENTS

Figure 1:
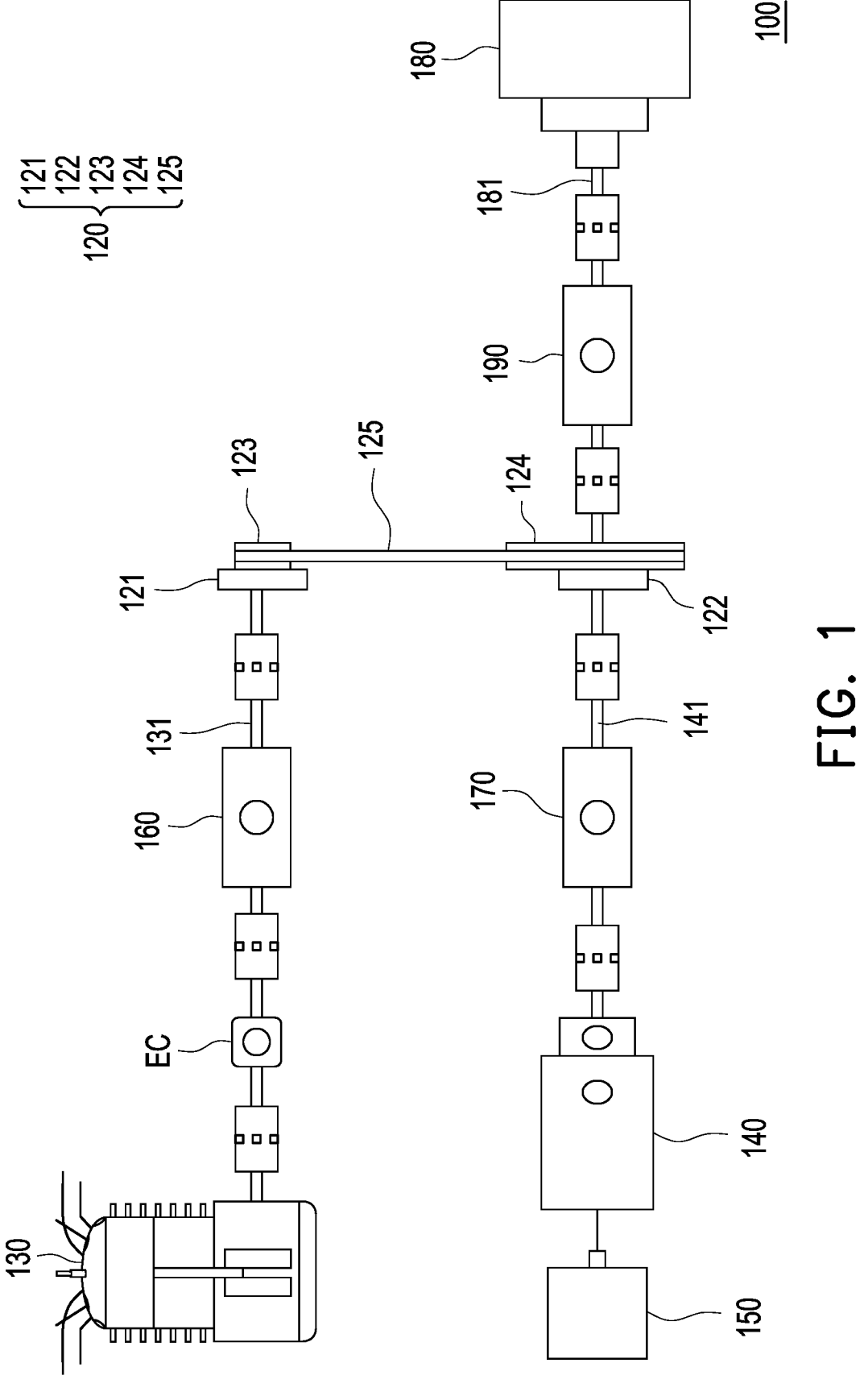
FIG. 1 is a structural schematic view of a hybrid power system according to an embodiment of the disclosure.
Figure 2:
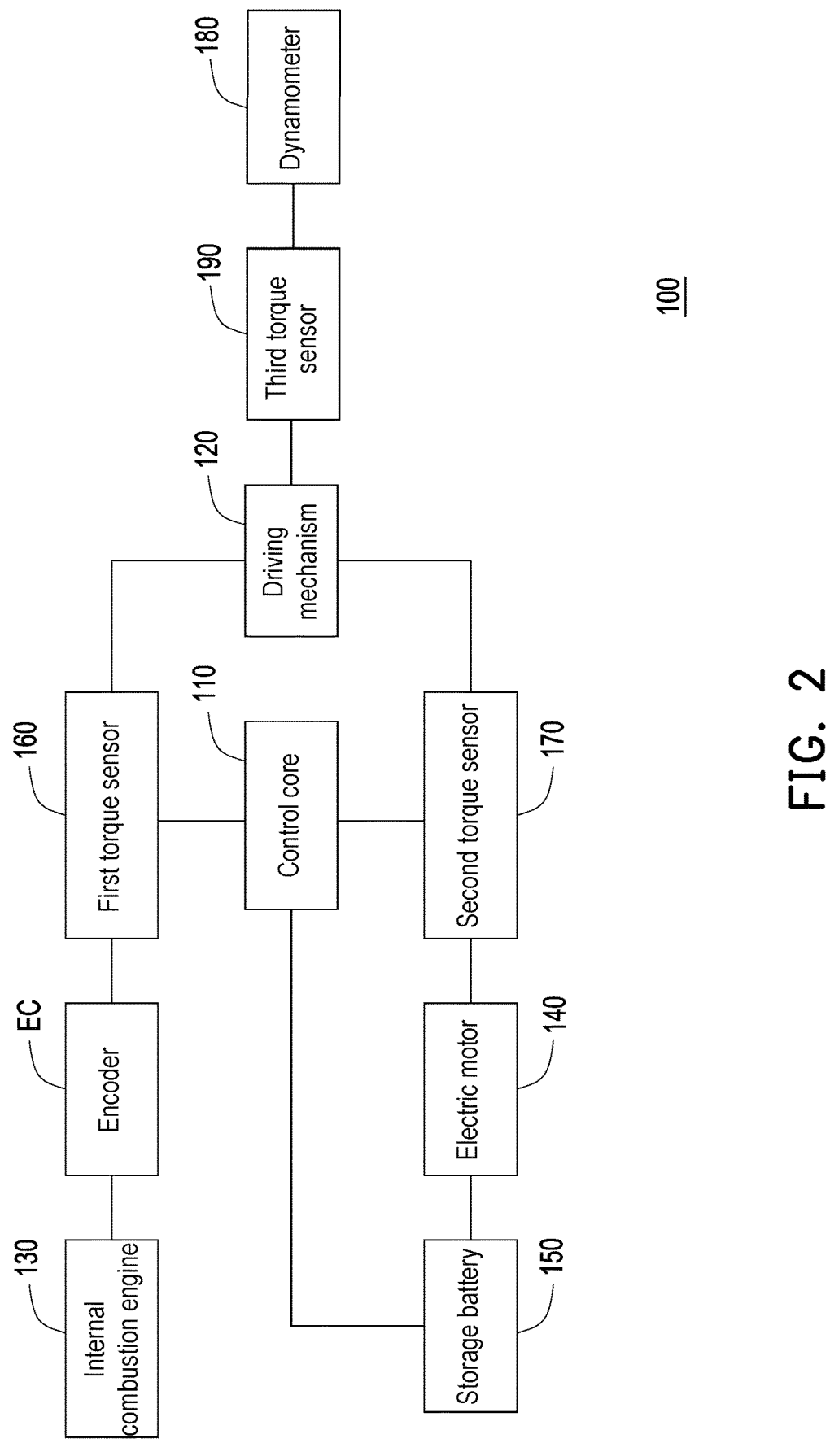
FIG. 2 is a block schematic view of the hybrid power system in FIG. 1.

FIG. 1 is a structural schematic view of a hybrid power system according to an embodiment of the disclosure. FIG. 2 is a block schematic view of the hybrid power system in FIG. 1.

Figure 3:
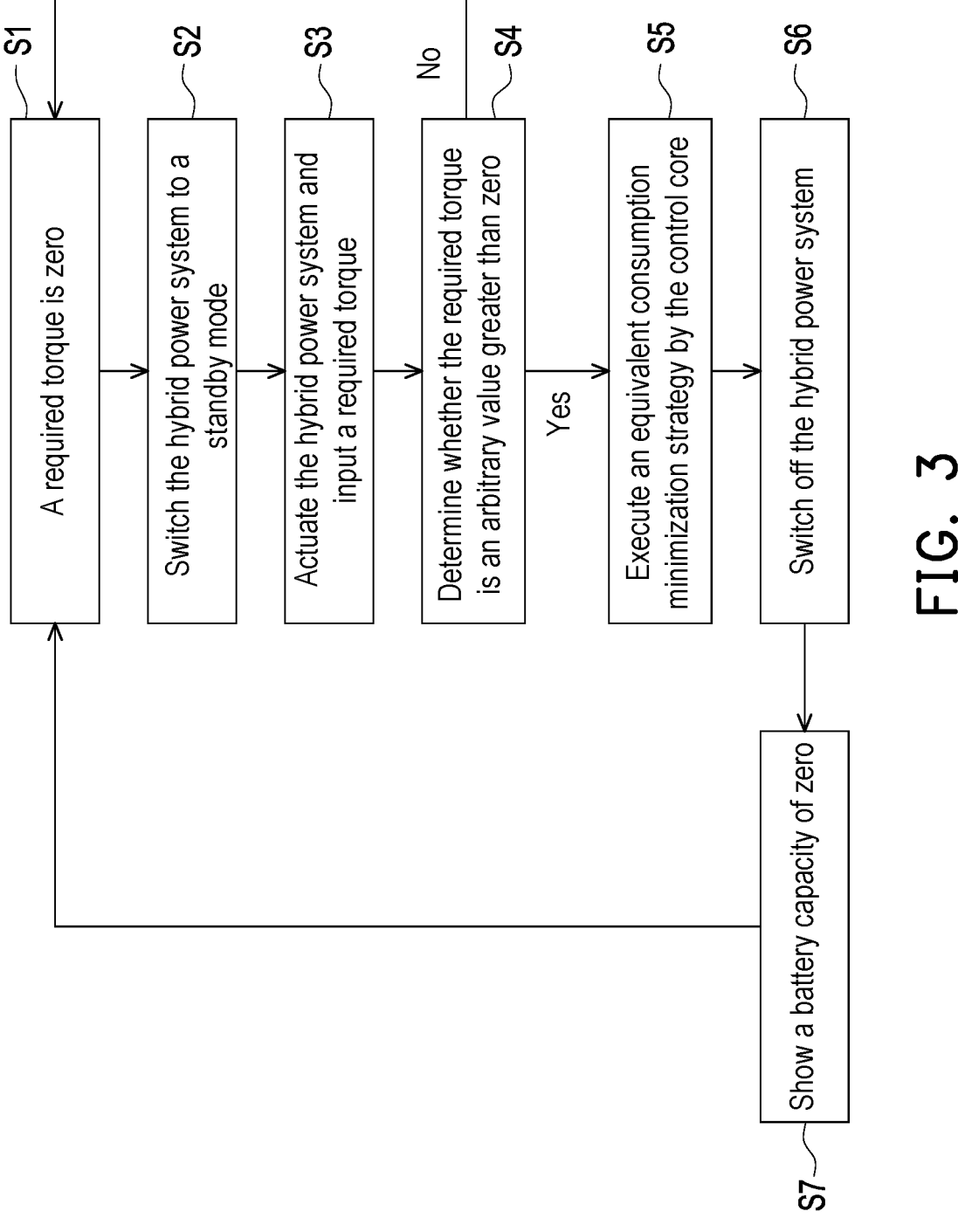
FIG. 3 is a flowchart of the optimizing method of the hybrid power system in FIG. 2.

Referring to FIG. 1 and FIG. 2, a hybrid power system 100 of the disclosure is adapted for vehicles. Through an optimal strategy, the purpose of efficient driving and power recycling, as well as optimal deployment of hybrid power are achieved. FIG. 3 is a flowchart of the optimizing method of the hybrid power system in FIG. 2.

Referring to FIG. 1 and FIG. 2, the hybrid power system 100 includes a control core 110, a driving mechanism 120, an internal combustion engine 130, an electric motor 140, and a storage battery 150.

The control core 110 is, for example, a central processing unit of a vehicle, which is configured to receive various signals to determine an operating status and output corresponding control commands according to the program logic, so as to achieve the purpose of automatic mode switching. The driving mechanism 120 is controlled by the control core 110. The driving mechanism 120 is, for example, connected to tires of the vehicle. The internal combustion engine 130 is connected to the driving mechanism 120 and controlled by the control core 110. The electric motor 140 is connected to the driving mechanism 120 and controlled by the control core 110. The storage battery 150 is coupled to the electric motor 140 and the control core 110. The storage battery 150 may be a rechargeable battery using lead-acid cells, nickel-metal hydride batteries, lithium-ion batteries, aluminum cells, or fuel cells.

With reference to FIG. 3, in response to a required torque $T_d$ being input to the control core 110, the control core 110 executes an equivalent consumption minimization strategy (as shown in FIG. 3) and actuates the internal combustion engine 130 and/or the electric motor 140 to transmit power to the driving mechanism 120. In short, the control core 110 calculates an optimal power output ratio of the internal combustion engine 130 and the electric motor 140 under the condition of the required torque $T_d$ according to the equivalent consumption minimization strategy.

Referring to FIG. 1 and FIG. 2, the driving mechanism 120 has a first clutch 121, a second clutch 122, a first rotating wheel 123, a second rotating wheel 124, and a conveyor belt 125. The first clutch 121 is disposed around a first rotation axis 131 of the internal combustion engine 130. The second clutch 122 is disposed around a second rotation axis 141 of the electric motor 140. The first rotating wheel 123 is connected to the first clutch 121. The second rotating wheel 124 is connected to the second clutch 122. The conveyor belt 125 is disposed around the first rotating wheel 123 and the second rotating wheel 124.

Referring to FIG. 1 and FIG. 2, the hybrid power system 100 is adapted for switching to an internal combustion engine 130 power mode, that is, switching off the electric motor 140 and using the internal combustion engine 130 as a single power source. In response to the control core 110 actuating the internal combustion engine 130, the control core 110 locks the first clutch 121 and releases the second clutch 122. The power of the internal combustion engine 130 is transmitted to the first clutch 121 through the first rotation axis 131. Since the first clutch 121 is locked to the first rotation axis 131, the first clutch 121 and the first rotating wheel 123 rotate along with the first rotation axis 131 and drive the second rotating wheel 124 to rotate relative to the second rotation axis 141 through the first rotating wheel 123 and the conveyor belt 125.

Referring to FIG. 1 and FIG. 2, the hybrid power system 100 is adapted for switching to an electric motor 140 power mode, that is, switching off the internal combustion engine 130 and using the electric motor 140 as a single power source. In response to the control core 110 actuating the electric motor 140, the control core 110 locks the second clutch 122 and releases the first clutch 121. The power of the electric motor 140 is transmitted to the second clutch 122 through the second rotation axis 141. Since the second clutch 122 is locked to the second rotation axis 141, the second clutch 122 and the second rotating wheel 124 rotate along with the second rotation axis 141 and drive the first rotating wheel 123 to rotate relative to the first rotation axis 131 through the second rotating wheel 124 and the conveyor belt 125.

Referring to FIG. 1 and FIG. 2, the hybrid power system 100 is adapted for switching to a maximum power mode, that is, simultaneously actuating the internal combustion engine 130 and the electric motor 140 as dual power outputs. In response to the control core 110 actuating the internal combustion engine 130 and the electric motor 140, the control core 110 simultaneously locks the first clutch 121 and the second clutch 122. The internal combustion engine 130 drives the first rotating wheel 123 through the first rotation axis 131 and the first clutch 121, and the electric motor 140 drives the second rotating wheel 124 through the second rotation axis 141 and the second clutch 122, thereby achieving the purpose of maximizing the power output.

Referring to FIG. 1 and FIG. 2, the hybrid power system 100 is adapted for charging the storage battery 150 to achieve the purpose of power recycling. The trigger condition is that the remaining battery of the storage battery 150 is lower than a default value (e.g., lower than 20%), and the control core 110 switches the electric motor 140 to a generator mode. In response to the electric motor 140 being switched to the generator mode, the control core 110 simultaneously locks the first clutch 121 and the second clutch 122, and the electric motor 140 is switched off at this point to use the internal combustion engine 130 as a single power source. The power of the internal combustion engine 130 drives the first rotating wheel 123, the conveyor belt 125, the second rotating wheel 124 through the first rotation axis 131 in sequence to drive the second rotation axis 141 to rotate in the electric motor 140 for charging the storage battery 150.

In this way, in response to the hybrid power system 100 using the internal combustion engine 130 as a single power source, it is suitable to recycle and use a portion of the power for charging. After the remaining battery of the storage battery 150 rises to a security level, the control core 110 automatically disable the generator mode of the electric motor 140 and return to a driving mode.

Referring to FIG. 1 and FIG. 2, the hybrid power system 100 further includes a first torque sensor 160 and a second torque sensor 170. The first torque sensor 160 is connected between the driving mechanism 120 and the internal combustion engine 130 and coupled to the control core 110. The first torque sensor 160 is configured to detect a torque value when the internal combustion engine 130 is operating and return the torque value to the control core 110. The second torque sensor 170 is connected between the driving mechanism 120 and the electric motor 140 and coupled to the control core 110. The second torque sensor 170 is configured to detect a torque value when the electric motor 140 is operating and return the torque value to the control core 110.

Referring to FIG. 1 and FIG. 2, the hybrid power system 100 further includes a dynamometer 180 and a third torque sensor 190. The dynamometer 180 is connected to the second rotating wheel 124 of the driving mechanism 120 through a third rotation axis 181, and the third rotation axis 181 and the second rotation axis 141 are disposed coaxially. The third torque sensor 190 is connected between the dynamometer 180 and the driving mechanism 120. Specifically, the dynamometer 180 serves as a load simulator, that is, the weight of the vehicle itself and the resistance generated during driving, which is beneficial to improve the simulation accuracy of the equivalent consumption minimization strategy executed by the hybrid power system 100.

Referring to FIG. 1, the hybrid power system 100 further includes an encoder EC disposed around the first rotation axis 131 and configured to measure a rotating speed of the internal combustion engine 130 and feedback a signal to the control core 110. The control core 110 is adapted for receiving signal values of the encoder EC, the first torque sensor 160, and the second torque sensor 170 for dynamically switching the lock and release states of the first clutch 121 and the second clutch 122. In this way, the control core 110 may optimize the power output ratio of the internal combustion engine 130 and the electric motor 140 to achieve the purpose of minimizing the energy consumption.

Referring to FIG. 1 to FIG. 3, the optimizing method of the hybrid power system 100 of the disclosure is described below. Step S1: in response to a required torque $T_d$ detected by the control core 110 being zero, the hybrid power system 100 is not actuated. Step S2: the hybrid power system 100 is switched to a standby mode. Step 3: a required torque $T_d$ is input by a user to the control core 110 to actuate the hybrid power system 100. Step S4: the control core 110 determines whether the required torque $T_d$ is an arbitrary value greater than zero. Step S5: the hybrid power system 100 is switched to the standby mode in response to a negative result. Step S6: an equivalent consumption minimization strategy is executed by the control core 110 of the hybrid power system 100 in response to a positive result. At the same time, the control core 110 actuates the internal combustion engine 130 and/or the electric motor 140 to transmit power to the driving mechanism 120 according to the determination of the equivalent consumption minimization strategy. In this way, the control core 110 may optimize the power output ratio of the internal combustion engine 130 and the electric motor 140. Step S7: the hybrid power system 100 is guided to step S1 and step S2 and switched to the standby mode in response to the hybrid power system 100 being switched off, that is, the vehicle being switched off and the power of the storage battery 150 is displayed as zero.

In addition, the equivalent consumption minimization strategy (ECMS) use the system simulation results to present a multi-dimensional look-up table, which is encoded by a program and directly downloaded to the control core 110, so that the control core 110 may quickly search for the best solution according to various conditions, thereby adjusting the power output ratio of the internal combustion engine 130 and the electric motor 140. Thus, the equivalent consumption minimization strategy is adapted for power management and an electric energy/power system. In addition, the equivalent consumption minimization strategy optimizes the power recycling of the hybrid power system 100 during braking and downhill coasting, such as front and rear wheel braking torque distribution and hydraulic and in-wheel motor braking power recycling. In short, the power recycling technology of the hybrid power system 100 may establish an optimal distribution strategy under different driving modes.

Figure 4:
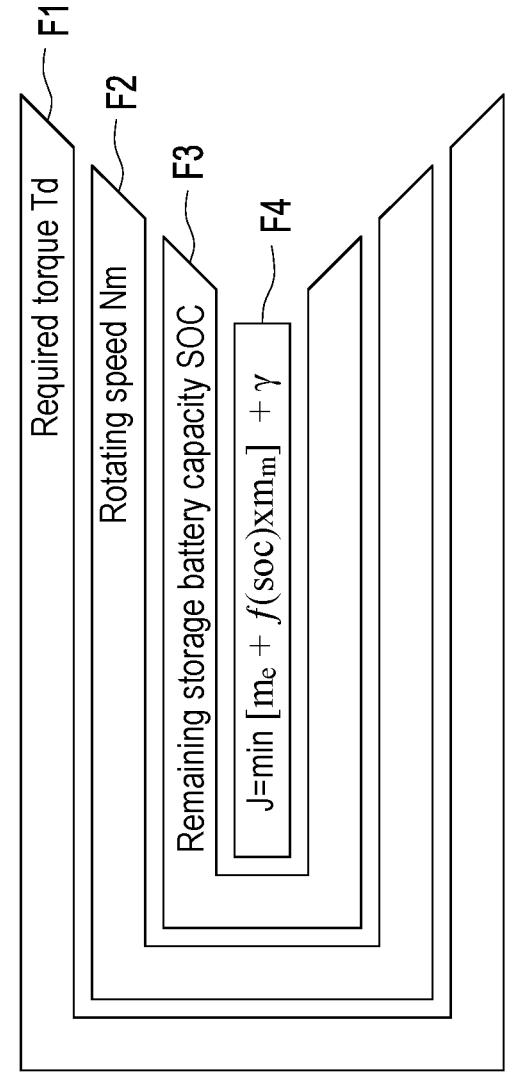
FIG. 4 is a schematic view of the loop calculation of the equivalent consumption minimization strategy of the hybrid power system in FIG. 3.

FIG. 4 is a schematic view of the loop calculation of the equivalent consumption minimization strategy of the hybrid power system in FIG. 3.

Referring to FIG. 1 to FIG. 4, in response to the control core 110 executing the equivalent consumption minimization strategy, a four-loop formula is established. A first loop F1 is the required torque $T_d$. A second loop F2 is a rotating speed $N_m$ of the electric motor 140. A third loop F3 is a remaining storage battery capacity SOC. A fourth loop F4 is a function of the minimum equivalent consumption. The function of the minimum equivalent consumption is defined as $J=\min[m_c+f(SOC)*m_m]+\gamma$.

A global search is conducted for the required torque $T_d$, the rotating speed $N_m$ of the electric motor 140, and the remaining storage battery capacity SOC of the storage battery 150. For example, a search range of the required torque $T_d$ is 1 $N_m$ to 1000 $N_m$, a search range of the rotating speed $N_m$ is 1 rpm to 6000 rpm, and a search range of the remaining storage battery capacity SOC is 1% to 100%. A global grid search is used to calculate multiple minimum equivalent consumption of all conditions and output a multi-dimensional table. In detail, in response to a required torque $T_d$ of 500 $N_m$, the rotating speed $N_m$ is 1500 rpm and the remaining battery SOC is 65%. By substituting the three parameters above into $J=\min[m_c+f(SOC)*m_m]+\gamma$ for calculation, one of the values of minimum consumption may be obtained. As for the global grid search, a bunch of parameters of the required torque $T_d$, the rotating speed $N_m$, and the remaining storage battery capacity SOC are substituted, in sequence, into $J=\min[m_c+f(SOC)*m_m]+\gamma$ to obtain values of all the minimum equivalent consumption J within the search range and sort out a multi-dimensional table.

A corresponding array of values of the minimum equivalent consumption J is obtained through the multi-dimensional table and through inputting parameters of a specific required torque $T_d$, the rotating speed $N_m$ of the electric motor 140, and the remaining storage battery capacity SOC, so as to find a corresponding output torque $T_e$ of the internal combustion engine 130 in the array of values. In addition, the required torque $T_d$ is satisfied by output power of the internal combustion engine 130 and the electric motor 140. Moreover, in the equivalent consumption minimization strategy, the ratio of the rotating speed $N_e$ of the internal combustion engine to the rotating speed $N_m$ of the electric motor is set to 1:4. The output torque $T_e$ of the internal combustion engine 130 may be calculated by using the parameters such as the required torque $T_d$, the rotating speed $N_m$ of the electric motor, and the remaining storage battery capacity SOC.

Furthermore, the hybrid power system 100 of the disclosure is in pursuit of minimum energy consumption, so the minimum equivalent consumption function $J=\min[m_c+f(SOC)*m_m]+\gamma$ is defined for calculating a total dynamic energy consumption of the hybrid power system 100. In the minimum equivalent consumption function, the electric energy consumption of the electric motor 140 is converted into the equivalent fuel consumption and summed up with the fuel consumption of the internal combustion engine 130 to obtain the equivalent total fuel consumption (minimum equivalent consumption J).

Specifically, in the above minimum equivalent consumption function, $m_e$ is an actual fuel consumption of the internal combustion engine 130, and $m_m$ is the equivalent fuel consumption of the electric motor 140.

In the minimum equivalent consumption function, in order to enable the electric motor to be used with the storage battery 150 under a good working condition, a weight f(SOC) of the charging status of the battery is designed. The weighting value f(SOC) and a relation curve of the battery and the charging status may be obtained through the formula $f(SOC)=1-(1-0.7x_{soc})*x_{soc}^3$.

The hybrid power system 100 gives a weighting value f(SOC) according to the charging status of the storage battery 150 at each sampling time. In response to high remaining battery of storage battery 150, the weighting value f(SOC) is low; in response to low remaining battery of storage battery 150, the weighting value f(SOC) is high. For example, in response to low remaining battery of the storage battery 150 and a high weighting value f(SOC), the equivalent fuel consumption $m_m$ of the electric motor 140 at a same rotating speed $N_m$ increases. That is, the storage battery 150 consumes more energy when the battery is low, and saves more energy when the battery is high.

$\gamma$ is a penalty value of the physical limit of the element. In response to the hybrid power system 100 executing the minimum equivalent consumption function to calculate the output torque of a dual power source, the minimum equivalent consumption function gives the penalty value $\gamma$ in response to the substituted torque parameter exceeding an actual physical limit of the internal combustion engine 130 and the electric motor 140. The minimum equivalent consumption J calculated by the minimum equivalent consumption function generates a maximum, and this best value result is not used by the control core 110.

Specifically, in response to calculating the fuel consumption $m_e$ of the internal combustion engine 130, the hybrid power system 100 gets a current average brake-specific fuel consumption (BSFC) through two-dimensional lookup according to the torque and rotating speed sampled at each moment. Therefore, the formula for the fuel consumption $m_e$ is $m_e(t)=[\overline{BSFC}(t)*T_e*N_e/1000]/3600$. $T_e$ is the output torque of the internal combustion engine, and $N_e$ is the output rotating speed of the internal combustion engine.

In detail, the equivalent fuel consumption $m_m$ of the electric motor 140 is the sum of two modes of the electric motor 140, that is, $m_m=m_{m,t}+m_{m,g}$. The former ($m_{m,t}$) is the motor driving mode, and the latter ($m_{m,g}$) is the generator mode.

With reference to FIG. 1 to FIG. 4, in the motor driving mode, the electric motor 140 converts the electric energy of the storage battery 150 into power and outputs to the driving mechanism 120. The equivalent fuel consumption formula thereof is defined as $m_{m,t}=295*(T_m*N_m/1000)/3600*\eta^m$. In the above formula, $m_{m,t}$ indicates the equivalent fuel consumption in the motor driving mode. $T_m$ and $\eta^m$ indicate, respectively, the output torque and the rotating speed in the motor driving mode, and $\eta_m$ indicates the rotating efficiency of the electric motor 130 in the motor mode.

In response to the electric motor 140 switching to the generator mode, the power of the internal combustion engine 130 is transmitted to the second rotation axis 141 of the electric motor 140 to drive the second rotation axis 141 to rotate in the electric motor 140 and charge the storage battery 150. The equivalent fuel consumption formula thereof is defined as $m_{m,g}=295*(T_m*N_m/1000)/3600*\eta_g$. In the above formula, $m_{m,g}$ indicates the equivalent fuel consumption in the generator mode. $T_m$ and $N_m$ indicate, respectively, the torque (a negative torque value represents the generator mode) and the rotating speed (driving mode and generator mode have the same rotating speed) in the generator mode, and $\eta_g$ is the rotating efficiency of the electric motor 130 in the generator mode.

To sum up, the hybrid power system of the disclosure is adapted for vehicles, and the hybrid power system has an internal combustion engine, an electric motor, a storage battery, and a driving mechanism. Through the equivalent consumption minimization strategy, the minimum energy consumption under different parameter conditions, such as required torque, motor rotating speed, and remaining battery, may be calculated, so as to achieve the purpose of efficient driving and power recycling. With the equivalent consumption minimization strategy, the hybrid power system may automatically adjust the output ratio of the dual power of the internal combustion engine and the electric motor, thereby improving the operating endurance of the hybrid power system and avoiding damage and security issues caused by excessive charge/discharge of the storage battery.

Furthermore, the optimizing method of the hybrid power system of the disclosure adopts the equivalent consumption minimization strategy to set a minimum equivalent consumption function. The minimum equivalent consumption function may calculate the minimum equivalent fuel consumption of the internal combustion engine and the electric motor under test conditions. In addition, a penalty value is also added to the minimum equivalent consumption function, and the global grid search is used to output the multi-dimensional table, so as to calculate the performance of the hybrid power system under different parameter conditions.

What is claimed is:

1. A hybrid power system, comprising:
   a control core;
   a driving mechanism, controlled by the control core;
   an internal combustion engine, connected to the driving mechanism and controlled by the control core;
   an electric motor, connected to the driving mechanism and controlled by the control core; and
   a storage battery, coupled to the electric motor and the control core,
   wherein in response to a required torque being input to the control core, the control core executes an equivalent consumption minimization strategy and actuates the internal combustion engine and/or the electric motor to transmit power to the driving mechanism,
   wherein the equivalent consumption minimization strategy establishes a four-loop formula, conducts a global search for the required torque, a rotating speed of the electric motor, and a remaining storage battery capacity of the storage battery, and uses a global grid search to calculate a plurality of minimum equivalent consumption of all conditions and output a multi-dimensional table.

2. The hybrid power system according to claim 1, wherein the driving mechanism has a first clutch, a second clutch, a first rotating wheel, a second rotating wheel, and a conveyor belt, the first clutch is disposed around a first rotation axis of the internal combustion engine, the second clutch is disposed around a second rotation axis of the electric motor, the first rotating wheel is connected to the first clutch, the second rotating wheel is connected to the second clutch, the conveyor belt is disposed around the first rotating wheel and the second rotating wheel.

3. The hybrid power system according to claim 2, wherein in response to the control core actuating the internal combustion engine, the control core locks the first clutch and releases the second clutch, and the internal combustion engine drives the second rotating wheel to rotate relative to the second rotation axis through the first rotating wheel and the conveyor belt.

4. The hybrid power system according to claim 2, wherein in response to the control core actuating the electric motor, the control core locks the second clutch and releases the first clutch, and the electric motor drives the first rotating wheel to rotate relative to the first rotation axis through the second rotating wheel and the conveyor belt.

5. The hybrid power system according to claim 2, wherein in response to the control core actuating the internal combustion engine and the electric motor, the control core locks the first clutch and the second clutch, and the internal combustion engine drives the first rotating wheel through the first rotation axis and the electric motor drives the second rotating wheel through the second rotation axis.

6. The hybrid power system according to claim 2, wherein in response to the electric motor switching to a generator mode, the control core locks the first clutch and the second clutch, and the internal combustion engine drives the first rotating wheel and the second rotating wheel through the first rotation axis to drive the second rotation axis to rotate in the electric motor for charging the storage battery.

7. The hybrid power system according to claim 1, further comprising a first torque sensor and a second torque sensor, wherein the first torque sensor is connected between the driving mechanism and the internal combustion engine and coupled to the control core, and the second torque sensor is connected between the driving mechanism and the electric motor and coupled to the control core.

8. The hybrid power system according to claim 1, further comprising a dynamometer and a third torque sensor, wherein the dynamometer is connected to the driving mechanism through a third rotation axis, and the third torque sensor is connected between the dynamometer and the driving mechanism.

9. The hybrid power system according to claim 2, further comprising an encoder, disposed around the first rotation axis and configured to measure a rotating speed of the internal combustion engine and feedback a signal to the control core.

10. An optimizing method for a hybrid power system, comprising:

a control core;

a driving mechanism, controlled by the control core;

an internal combustion engine, connected to the driving mechanism and controlled by the control core;

an electric motor, connected to the driving mechanism and controlled by the control core; and a storage battery, coupled to the electric motor and the control core, wherein the optimizing method for the hybrid power system comprises:

switching the hybrid power system to a standby mode in response to a required torque detected by the control core being zero;

inputting a required torque to the control core to actuate the hybrid power system;

determining whether the required torque is an arbitrary value greater than zero;

switching the hybrid power system to the standby mode in response to a negative result;

executing, by the control core of the hybrid power system, an equivalent consumption minimization strategy in response to a positive result;

actuating, by the control core, the internal combustion engine and/or the electric motor simultaneously to transmit power to the driving mechanism;

switching off the hybrid power system and showing a battery capacity of zero; and switching the hybrid power system to the standby mode, wherein the equivalent consumption minimization strategy establishes a four-loop formula, conducts a global search for the required torque, a rotating speed of the electric motor, and a remaining storage battery capacity of the storage battery, and uses a global grid search to calculate a plurality of minimum equivalent consumption of all conditions and output a multi-dimensional table.

11. The optimizing method for the hybrid power system according to claim 10, wherein a function of the minimum equivalent consumption is defined as $J=\min [m_e + f(SOC) * m_m] + \gamma$.

12. The optimizing method for the hybrid power system according to claim 11, wherein a corresponding array of values of the minimum equivalent consumption is obtained through the multi-dimensional table and through inputting parameters of a specific required torque, a motor rotating speed, and the remaining storage battery capacity, so as to find a corresponding output torque of the internal combustion engine in the array of values.

13. The optimizing method for the hybrid power system according to claim 10, wherein the driving mechanism has a first clutch, a second clutch, a first rotating wheel, a second rotating wheel, and a conveyor belt, the first clutch is disposed around a first rotation axis of the internal combustion engine, the second clutch is disposed around a second rotation axis of the electric motor, the first rotating wheel is connected to the first clutch, the second rotating wheel is connected to the second clutch, the conveyor belt is disposed around the first rotating wheel and the second rotating wheel.

14. The optimizing method for the hybrid power system according to claim 13, wherein in response to the control core actuating the internal combustion engine, the control core locks the first clutch and releases the second clutch, and the internal combustion engine drives the second rotating wheel to rotate relative to the second rotation axis through the first rotating wheel and the conveyor belt.

15. The optimizing method for the hybrid power system according to claim 13, wherein in response to the control core actuating the electric motor, the control core locks the second clutch and releases the first clutch, and the electric motor drives the first rotating wheel to rotate relative to the first rotation axis through the second rotating wheel and the conveyor belt.

16. The optimizing method for the hybrid power system according to claim 13, wherein in response to the control core actuating the internal combustion engine and the electric motor, the control core locks the first clutch and the second clutch, and the internal combustion engine drives the first rotating wheel through the first rotation axis and the electric motor drives the second rotating wheel through the second rotation axis.

17. The optimizing method for the hybrid power system according to claim 13, wherein in response to the electric motor switching to a generator mode, the control core locks the first clutch and the second clutch, and the internal combustion engine drives the first rotating wheel and the second rotating wheel to drive the electric motor for charge the storage battery.

\* \* \* \* \*